US012779682B2

(12) United States Patent
Kaspar et al.

(10) Patent No.: US 12,779,682 B2
(45) Date of Patent: Nov. 3, 2026

(54) ADAPTATION OF A GRIPPING SIMULATION BY WAY OF PARAMETER IDENTIFICATION IN THE REAL WORLD

(71) Applicant: KUKA Deutschland GmbH, Augsburg (DE)

(72) Inventors: Manuel Kaspar, Obergammergau (DE); Jonas Schwinn, Diedorf (DE)

(73) Assignee: KUKA Deutschland GmbH (DE)

( * ) Notice: Subject to any disclaimer, the term of this patent is extended or adjusted under 35 U.S.C. 154(b) by 0 days.

(21) Appl. No.: 19/125,819

(22) PCT Filed: Oct. 20, 2023

(86) PCT No.: PCT/EP2023/079212
§ 371 (c)(1),
(2) Date: Apr. 30, 2025

(87) PCT Pub. No.: WO2024/104707
PCT Pub. Date: May 23, 2024

(65) Prior Publication Data

US 2026/0175419 A1 Jun. 25, 2026

(30) Foreign Application Priority Data

Nov. 16, 2022 (DE) ..................... 10 2022 212 198.8

(51) Int. Cl.
*B25J 9/16* (2006.01)

(52) U.S. Cl.
CPC ........... *B25J 9/1633* (2013.01); *B25J 9/1612* (2013.01); *B25J 9/1664* (2013.01); *B25J 9/1669* (2013.01); *B25J 9/1697* (2013.01)

(58) Field of Classification Search
CPC ...... B25J 9/1633; B25J 9/1612; B25J 9/1664; B25J 9/1669; B25J 9/1697
See application file for complete search history.

(56) References Cited

U.S. PATENT DOCUMENTS 4,706,004 A * 11/1987 Komatsu ................. B24B 27/04
318/568.22
5,046,022 A * 9/1991 Conway ................. B25J 9/1689
700/250

(Continued)

FOREIGN PATENT DOCUMENTS

DE 102020127508 A1 4/2021
WO 2021124445 A1 6/2021

OTHER PUBLICATIONS

Méndez et al., Robotic Pick-and-Place Time Optimization: Application to Footwear Production, 2020, IEEE, p. 1-13 (Year: 2020).*

(Continued)

*Primary Examiner* — Mcdieunel Marc
(74) *Attorney, Agent, or Firm* — Dorton & Willis, LLP

(57) ABSTRACT

A method for automatic optimization of parameters for a robot-assisted gripping operation includes determining gripping real data, wherein the gripping real data describe at least one gripping success of a grip position on an object gripped by a gripping robot; and/or determining holding real data, wherein the holding real data describe at least one parameter which is linked to a gripping operation, in particular a grip, in particular a force on the object gripped by the gripping robot; and simulating, in particular replicating, at least one gripping operation, in particular a grip, in a simulation environment based on the gripping operation, which forms the basis of the determined gripping real data and/or the determined holding data. The method further includes data-based optimizing of parameters, in particular optimizing parameters based on the determined gripping real data and/or based on the determined holding real data, in order to determine optimized parameters.

14 Claims, 3 Drawing Sheets

(56) References Cited

U.S. PATENT DOCUMENTS

| | | | | |
|---|---|---|---|---|
| 7,123,992 | B2 * | 10/2006 | Ban | B25J 9/1697<br>700/258 |
| 7,269,479 | B2 * | 9/2007 | Okamoto | B25J 9/0003<br>901/2 |
| 8,355,815 | B2 * | 1/2013 | Luce | E21B 10/02<br>901/41 |
| 10,800,033 | B2 * | 10/2020 | Yamada | B25J 9/1697 |
| 11,926,043 | B2 * | 3/2024 | Maurer | B25J 19/0041 |
| 2019/0001491 | A1 * | 1/2019 | Umeyama | B25J 9/1612 |
| 2021/0122045 | A1 | 4/2021 | Handa et al. | |
| 2021/0283771 | A1 * | 9/2021 | Ijiri | B25J 9/1664 |
| 2023/0046345 | A1 * | 2/2023 | Oka | B25J 9/1612 |
| 2024/0286279 | A1 * | 8/2024 | Lii | B25J 13/025 |
| 2025/0187201 | A1 * | 6/2025 | Dendas | B25J 9/1697 |
| 2025/0275814 | A1 * | 9/2025 | Ruff | A61B 34/20 |

OTHER PUBLICATIONS

Tanaka et al., A Learning Method of Dual-arm Manipulation for Cloth Folding Using Physics Simulator, 2019, p. 756-7762 (Year: 2019).*

Wang et al., Parallel gripping explicit force control of robot hand with dual fingers, 2011, IEEE, p. 4559-4562 (Year: 2011).*

Silva et al., Estimation of Lightweight Object's Mass by a Humanoid Robot During a Precision Grip with Soft Tactile Sensors, 2019, IEEE, p. 344-348 (Year: 2019).*

European Patent Office; Search Report in related International Patent Application No. PCT/EP2023/079212 dated Jan. 29, 2024; 6 pages.

Wang Austin S et al. "Homography-Based Deep Visual Servoing Methods for Planar Grasps"; 2019 IEEE/RSJ International Conference on Intelligent Robots and Systems (IROS), IEEE; Nov. 3, 2019 (Nov. 3, 2019); pp. 6570-6577; DOI: 10.1109/IROS40897.2019.8968160; XP033695739; the whole document.

Fatikow S et al. "Intelligent Robot Hand Control System Using a Tailorable Parallel Computer Concept"; Proceedings of the IEEE/RSJ/GI International Conference on Intelligent Robots and Systems: Advanced Robotic Systems and the Real World; Munich, Sep. 12-16, 1994; vol. 1; Sep. 12, 1994 (Sep. 12, 1994); pp. 216-223; XP000512679; the whole document.

German Patent Office; Search Report in related German Patent Application No. DE 10 2022 212 198.8 dated Nov. 12, 2024; 4 pages.

* cited by examiner

ADAPTATION OF A GRIPPING SIMULATION BY WAY OF PARAMETER IDENTIFICATION IN THE REAL WORLD

CROSS-REFERENCE TO RELATED APPLICATIONS

This application is a national phase application under 35 U.S.C. § 371 of International Patent Application No. PCT/EP2023/079212, filed Oct. 20, 2023 (pending), which claims the benefit of priority to German Patent Application No. DE 10 2022 212 198.8, filed Nov. 16, 2022, the disclosures of which are incorporated by reference herein in their entirety.

TECHNICAL FIELD

The present invention relates to a method for the automatic optimization of parameters, in particular for a robot-assisted gripping operation, a method for controlling a gripping robot, a system for the automatic optimization of parameters, and a computer program or computer program product.

BACKGROUND

In the current prior art, technical systems are partly trained in simulation environments. For this purpose, simulated data are usually generated in any quantity. However, these simulated data are only a qualitative representation of reality. The difference between simulation and reality is commonly referred to as the simulation-to-reality gap (Sim2Real gap).

SUMMARY

The object of the present invention is in particular to reduce the simulation-to-reality gap and, further in particular, to optimize the parameterization of the simulation.

The solution to this problem is achieved in accordance with the teaching of the independent claims. Various embodiments and developments of the invention are the subject of the dependent claims.

In one embodiment of the present invention, a method for automatically optimizing parameters, in particular for a robot-assisted gripping operation, is provided. In one embodiment, the method comprises determining of gripping real data, wherein the gripping real data describe at least one gripping success of a grip position, in particular on an object to be gripped by way of a gripping robot or on an object gripped by way of a gripping robot. Alternatively or additionally, the method comprises determining of holding real data, wherein the holding real data describe at least one force, in particular a force on the object gripped by way of a gripping robot and/or on the gripper of the gripping robot, which in particular has (successfully) gripped an object to be gripped. In one embodiment, the holding real data describe at least one parameter or relevant property relevant to the existence of the grip on the gripped object, in particular a parameter or property which is linked to the grip. In one embodiment, a relevant parameter or a property is a force, in particular a normal force, a frictional force, in particular a friction or a friction coefficient, such as in particular (for) a static friction, a combined sliding and rolling friction, a rolling friction, spinning friction, and/or lateral friction, which acts on the gripping object and/or on at least one gripper finger, in particular a closing force of the at least one gripper finger, and/or a mass, inertia and/or position of a center of mass of the gripping object and/or of the at least one gripper finger. In one embodiment, the method further comprises, in particular in one step, simulating, in particular replicating, further in particular in a simulation environment, wherein at least one gripping operation, in particular grip, is carried out in the simulation environment based on the gripping operation, in particular grip, which forms the basis of the determined gripping real data and/or the determined holding real data. In one embodiment, the method further comprises, in particular in one step, a data-based optimizing of parameters of the simulated gripping operation, in particular of the simulated grip. Alternatively or additionally, the method comprises optimizing the parameters of the simulated gripping operation, in particular the simulated grip, based on the determined gripping real data and/or based on the determined holding real data.

In this way, in one embodiment, optimized parameters can advantageously be determined, in particular an improved simulation environment can advantageously be achieved, further in particular a more realistic or near-realistic/closer-to-realistic simulation or simulation environment, in particular in comparison with simulations or simulation environments that do not optimize or are not optimized based on gripping real data and/or holding real data.

The term "gripping real data", as used herein, is to be understood in particular as information, furthermore in particular digital information, which describes data of a real gripping operation, in particular of a grip actually carried out. In particular, the term, in one embodiment, is to be understood as a counterpart to "gripping simulation data", wherein the "gripping simulation data" refers to information, the data of a simulated gripping operation, in particular a simulated grip, in a simulation environment.

The term "holding real data", as used herein, is to be understood in particular as information, furthermore in particular digital information, which describes data of a holding during or in the course of a gripping operation actually carried out, in particular during or in the course of a grip actually carried out. In particular, the term should be understood, in one embodiment, as a counterpart to "holding simulation data".

In one embodiment, the "real data" and the "simulation data" each describe the same thing or information, respectively for the reality and the simulation, or the simulation environment.

In one embodiment, the data-based optimization comprises an automatic adaptation of the parameters, in particular an automatic adaptation of a simulated mass of the simulation, an automatic adaptation of (simulated) dynamic parameters and/or a simulated force, in particular frictional force or friction. In one embodiment, the automatic adaptation of the parameters is based on at least one evaluation of a cost function that underlies the optimization or on the basis of which optimization is achieved.

In one embodiment, the data-based optimization, in particular the optimizing of the parameters, is based on a cost function of gripping real data and gripping simulation data and/or holding real data and holding simulation data. In one embodiment, the gripping simulation data describe at least one simulated gripping parameter, in particular a gripping success of a grip position in the simulation. In one embodiment, the holding simulation data describe at least one simulated holding parameter, in particular a force of the simulated grip. In one embodiment, the cost function may be based on a comparison of matching entries in vectors of successful grips in reality and the simulation, in particular a cost function c=sum(amount(gripping_success_real-gripping_success_sim)), wherein gripping_success_real corresponds to a vector for a gripping success in reality, in particular for a grip executed in reality, and gripping_success_sim corresponds to a vector for a gripping success for a corresponding grip in the simulation environment. In one embodiment, the entries in the vectors can be 1 or 0, corresponding to a successful grip or an unsuccessful grip. In one embodiment, the data-based optimization comprises the adaptation of, in particular abstract, parameters, such as in particular time steps of the simulation, solver iterations or the like, further in particular "lateral friction", "rolling friction", "spinning friction" of the gripping object and/or "lateral friction", "rolling friction", "spinning friction" of the gripper, in particular of at least one gripper finger, a mass, an inertia and/or a center of mass of the gripping object, or the like.

In one embodiment, this advantageously makes it possible for decisions regarding the parameters, in particular dynamic parameters, to be estimated based on evaluations of the cost function. Thus, in one embodiment, if in particular a grip is close to the edge of the object and/or to the fingertips of the gripper fingers and if the object cannot be held or falls out of the gripper or slips out at the fingertips, the object can be made heavier in the simulation or a friction parameter can be adjusted, in particular advantageously automatically and/or in a data-based manner.

In one embodiment, the optimizing, in particular the data-based optimizing, is carried out by means of a gradient-free optimizer. In one embodiment, the optimization algorithm is based on a Monte Carlo algorithm or the optimization algorithm is a Monte Carlo algorithm, in particular a covariance matrix adaptation evolution strategy (CMA-ES) or the like.

In one embodiment, this makes it possible to perform optimizing of the parameters (more) quickly. Advantageously, this allows for automatic optimization in one embodiment.

In one embodiment, the determining of gripping real data comprises determining a plurality of grip positions, in particular collision-free and/or grippable grip positions, on the (real) object to be gripped. In one embodiment, the determining of gripping real data further comprises determining a plurality of grip positions, in particular collision-free and/or grippable grip positions. In one embodiment, the determining of gripping real data further comprises selecting one of the determined grip positions. In one embodiment, the determining of gripping real data further comprises gripping the object, in particular with a or the gripping robot, based on the selected grip position. In one embodiment, the determining of gripping real data further comprises storing the gripping success for the selected grip position, in particular for the selected grip position on the object to be gripped and for a pose of the object to be gripped, in particular on a work surface of the gripping robot.

In one embodiment, the determining of gripping real data comprises a step, in particular a preceding step, with randomized placement of an or the object to be gripped, in particular with the gripping robot.

In one embodiment, the determining of gripping real data further comprises repeating the method steps described herein for determining gripping real data.

In one embodiment, the object to be gripped is moved by the robot, in particular after the determining of gripping real data, to a random position, in particular to a random position in the working area of the gripping robot, and then dropped.

This can, in some embodiments, allow the object to be gripped to land in random poses, in particular on a work surface of the robot. Accordingly, in some embodiments, grip positions are determined that correspond to the random pose of the object to be gripped.

Advantageously, in some embodiments, this also makes it possible to obtain a pre-sorted set of grips for the object, in particular according to gripping success.

In one embodiment of the present invention, a method for optimizing a grasp sampler is provided. In one embodiment, the method comprises, at least substantially, the same steps as the determining of gripping real data, in particular selecting one of the determined grip positions based on a selection frequency of the grip positions, as described herein. Advantageously, in one embodiment, a grasp sampler can be optimized by means of the determined gripping real data, in particular a grip with a high or higher gripping success can be determined (more) quickly, in particular by the grasp sampler, further in particular based on the determined, in particular stored gripping real data.

In one embodiment, the selection of one of the determined grip positions, in particular when repeating the method steps described herein for determining gripping real data, is based on a selection frequency of the determined grip positions, in particular the determined grip position with the lowest selection frequency of the determined grip positions is selected.

In this way, a pre-sorted set of grip positions for an object to be gripped can advantageously be obtained, in particular (more) quickly.

In one embodiment, the determining of holding real data comprises determining a holding grip position, in particular on a gripped object, wherein the holding grip position is arranged on the object to be gripped and/or on the gripped object in such a way that a force can be exerted on the object to be gripped and/or on the gripped object via the holding grip position, which force can act or acts opposite to at least one force on the object to be gripped and/or on the gripped object, in particular opposite to a gripping direction of the gripping robot. In one embodiment, the determining of holding real data further comprises gripping, in particular holding, the object at the determined holding grip position, in particular by a holding robot different from the gripping robot. In one embodiment, this may include compensating for the gravity acting on the gripped object, in particular if the object is large compared to the gripper or gripping robot, and/or a heavy object, in particular compared to the maximum force of the gripping robot. In one embodiment, the determining of holding real data further comprises exerting a force, in particular via the holding grip position, further in particular by means of the holding robot, on the object, in particular a force that acts opposite to a force on the gripped object, further in particular a force that acts opposite to a force impressed on the object by the gripping robot (not by the holding robot), in particular opposite to a gripping direction of the gripping robot.

In one embodiment, this advantageously makes it possible for parameter values for a simulation to be determined or ascertained (more) accurately, in particular (more) quickly. Advantageously, in one embodiment, this makes it possible that in particular rotational forces, furthermore in particular rotational friction values, can be or are determined better than in particular without the use of a holding robot or than when only based on a simulation environment.

In one embodiment, the exertion of the force, in particular by means of the holding robot, comprises a successive increase of the force in predetermined steps, in particular until the gripping robot loses the gripped object and/or until an, in particular predetermined, maximum force is exceeded. In one embodiment, the exertion of force comprises a (numerical) measurement of the exerted force.

In one embodiment, this advantageously makes it possible for parameters for a simulation to be determined (more) accurately, in particular step by step. Furthermore, in one embodiment it can advantageously be made possible to determine (more) accurately at which applied force the grip was lost.

In one embodiment, the determining of gripping real data and/or holding real data comprises recording the object by means of a recording device. In one embodiment, the recording of the object comprises determining a pose of the object, in particular over time, further in particular localizing the gripped object, in particular in the gripper ("in-hand localization"), and/or tracking the object, in particular as long as it is gripped.

In one embodiment, in particular by recording the object with the recording device, further in particular by means of tracking, a cost function in one embodiment can be changed to c=sum(amount(traj-sim−traj_real)), wherein traj_sim refers to a recorded trajectory of the object in the simulation environment, in particular describes this trajectory, and wherein traj_real refers to a recorded trajectory of the object in reality, in particular describes this trajectory, or this cost function can be applied for the optimization. In one embodiment, in particular by recording the object with the recording device, at least one start position of the object, in particular a start frame, and one end position of the object, in particular an end frame, can be used for a cost function.

In one embodiment, this advantageously makes it possible to improve the parameter estimation for the optimization, in particular because the trajectory of the object contains more information than, in particular, a gripping success variable that indicates or describes the success or failure of the grip.

In one embodiment, alternatively or additionally, a movement of the object can be approximated via the end position of the holding robot and, in particular, can be included in the cost function.

In one embodiment, this advantageously allows information about the gripping operation to be obtained that goes beyond the information content of the gripping success, in particular offers or can offer an improved cost function.

In one embodiment of the invention, a method for controlling a gripping robot is provided. In one embodiment, the method comprises determining control data based on the optimized parameters according to an embodiment described herein, in particular for robot-assisted gripping, further in particular for a robot-assisted gripping operation. In one embodiment, the method comprises controlling and/or moving the gripping robot based on the optimized control data.

In one embodiment, this makes it possible for a movement and/or control of the robot to be first optimized in a simulation environment and then transferred to the robot, in particular in order to grip an object to be gripped better and/or (more) quickly. Furthermore, in one embodiment, this makes it possible for the grip, in particular a closing force of the gripper fingers or the like, to be used in a (more) optimized manner.

In one embodiment, embodiments of a method described herein are applicable or transferable to applications with a plurality of objects, in particular applications with a plurality of objects to be gripped in a container, provided that they are technically feasible and/or applicable. In particular, in one embodiment, the parameters determined for exposed objects can be transferred to a gripping process with a plurality of objects in a container, in particular applied, and further in particular based on the optimized parameters, control data for a gripping robot can be determined which is to grip or grips at least one object from a plurality of objects, in particular arranged in a container.

In one embodiment of the invention, a system for operating and/or monitoring at least one robot is provided. In one embodiment, the system comprises a gripping robot and means for determining a plurality of grip positions, in particular collision-free and/or grippable grip positions, in particular a grasp sampler. In one embodiment, the system and/or its means comprises means for selecting one of the determined grip positions, in particular a processing unit which is configured to select one of the determined grip positions. In one embodiment, the system and/or its means comprises means for gripping the object. In one embodiment, the system and/or its means comprise means for storing the gripping success, in particular a processing unit and/or in particular a memory, in particular in data connection with the processing unit.

In one embodiment, the system comprises means for determining gripping real data and/or means for determining holding real data, in particular at least one sensor which is configured to detect at least one parameter relevant to the gripping real data and/or to detect a parameter relevant to the holding real data. In one embodiment, the system comprises means for simulating, in particular for replicating, at least one gripping operation, in particular grip, of a gripping robot in a simulation environment. In one embodiment, the system comprises means for data-based optimizing of parameters, in particular of the simulation environment, in particular a or the processing unit.

In one embodiment, the system comprises a gripping robot and a holding robot. In one embodiment, the system comprises means for determining a holding grip position, in particular a or the processing unit. In one embodiment, the system, in particular the holding robot, comprises means for gripping, in particular holding, the holding grip position. In one embodiment, the system, in particular the holding robot, comprises means for exerting a force on the object.

In one embodiment, the system comprises a recording device. A recording device as described herein particularly preferably comprises a recording device for recording digital and/or two-dimensional, in particular three-dimensional, images, and can in particular have at least one 2D camera, 3D camera and/or at least two physically spaced-apart cameras and/or at least one scanner, preferably for three-dimensional scanning. In one embodiment, the recording device is configured to record a point cloud and/or color information, preferably a three-dimensional point cloud, further in particular a point cloud with color information, in particular assigned to the points of the point cloud. Accordingly, in particular a three-dimensional point cloud and/or color information recorded with the aid of a recording device is referred to as a frame or image (recorded with the aid of the recording device), which in one embodiment is generally a three-dimensional image and/or an image with color information.

In one embodiment, the recording device is arranged on at least one of the robots. In one embodiment, the recording device is alternatively or additionally arranged remotely from the robot, in particular such that the recording device can record, in particular track, or records, in particular tracks, an object to be gripped and/or a gripped object.

A system and/or a means in the sense of the present invention may be designed in hardware and/or in software, and in particular may comprise at least one, in particular digital, processing unit, in particular microprocessor unit (CPU), graphic card (GPU) or the like, which is preferably data-connected or signal-connected to a memory system and/or bus system, and/or one or multiple programs or program modules. The processing unit may be designed to process commands that are implemented as a program stored in a memory system, to detect input signals from a data bus and/or to issue output signals to a data bus. A memory system may comprise one or more, in particular different, storage media, in particular optical, magnetic, solid-state, and/or other non-volatile media. The program may be designed in such a way that it embodies or is capable of carrying out the methods described herein, so that the processing unit is able to carry out the steps of such methods and thus, in particular, is able to operate or monitor the robot.

In one embodiment, a computer program product may comprise, in particular be, an, in particular computer-readable and/or non-volatile, storage medium for storing a program or instructions or with a program stored thereon or with instructions stored thereon. In one embodiment, execution of said program or said instructions by a system or controller, in particular a computer or an arrangement of multiple computers, causes the system or controller, in particular the computer(s), to carry out a method described herein or one or more steps thereof, or the program or instructions are configured to do so.

In one embodiment, one or more, in particular all, steps of the method are implemented completely or partially automatically, in particular by the controller or its means.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
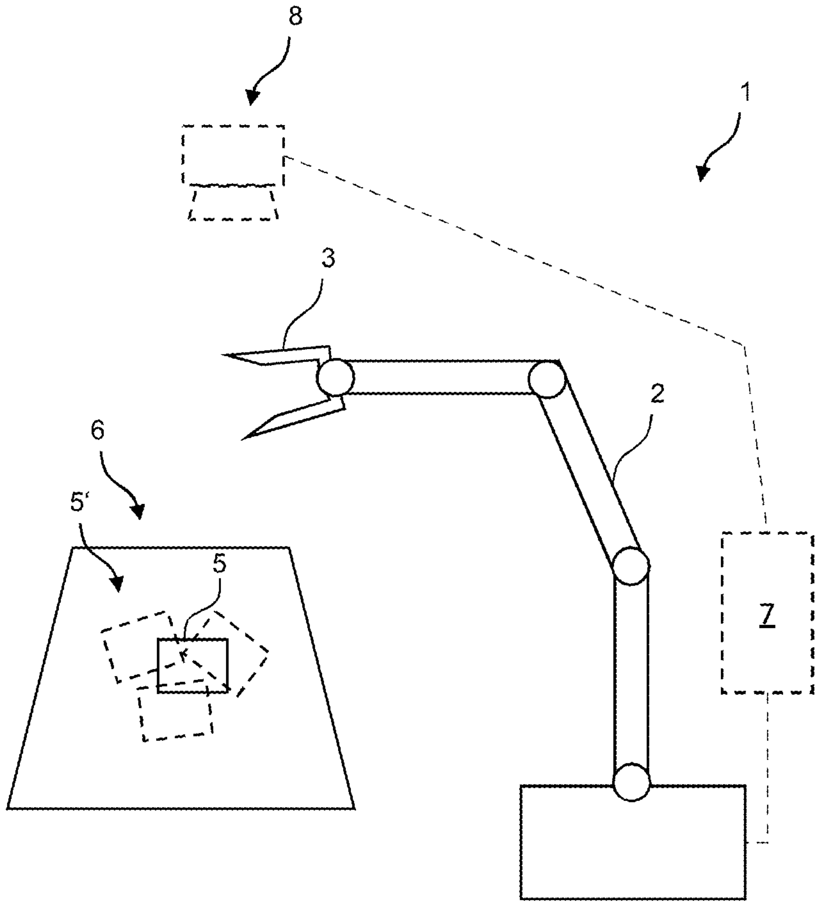
FIG. 1 schematically depicts a system according to one embodiment of the present invention.

FIG. 1 schematically shows system 1 with a gripping robot 2, which has a gripper 3 for gripping an object 5 to be gripped. The object 5 to be gripped is shown on a schematic work surface 6 of the system 1, wherein a single object 5 to be gripped is shown with solid lines. In one embodiment, the system 1 is configured for gripping a plurality of objects 5, 5' (shown in dashed lines) in a container (not shown), in particular in order to carry out a method described herein. In one embodiment, the system 1 may have a recording device 8 which, as shown in dashed lines in FIG. 1, is not arranged on the robot 2. In one embodiment, the recording device can be arranged on the robot 2, in particular on a flange of the robot 2. Furthermore, the system in FIG. 1 has a processing unit 7 which is in data connection with the robot 2 and is in particular configured to control or monitor the robot 2. The robot 2 is further configured to grip the object 5 to be gripped based on a determined grip position. If the gripping operation of the robot 2 is repeated and the gripping success of the grip position is recorded, the gripping successes can be ordered according to the grip position and/or the pose, in particular the location, of the object and, in particular, based on this recording, a sorting of the grip positions according to gripping success can be derived. For this purpose, in particular, the grip position that has been gripped the least (so far) can be selected. Accordingly, data, in particular on the gripping success of possible grip positions, which are or were determined using grasp samplers, can be determined and stored. These data can be used in particular for a simulation of the system 1 in a simulation environment, wherein the system 1 in the simulation environment comprises, at least substantially, the components of the real system 1. Thus, the data obtained from the real system 1 can be used to optimize the parameters in the simulation environment, in particular based on the data obtained in reality, in particular gripping real data.

Figure 2:
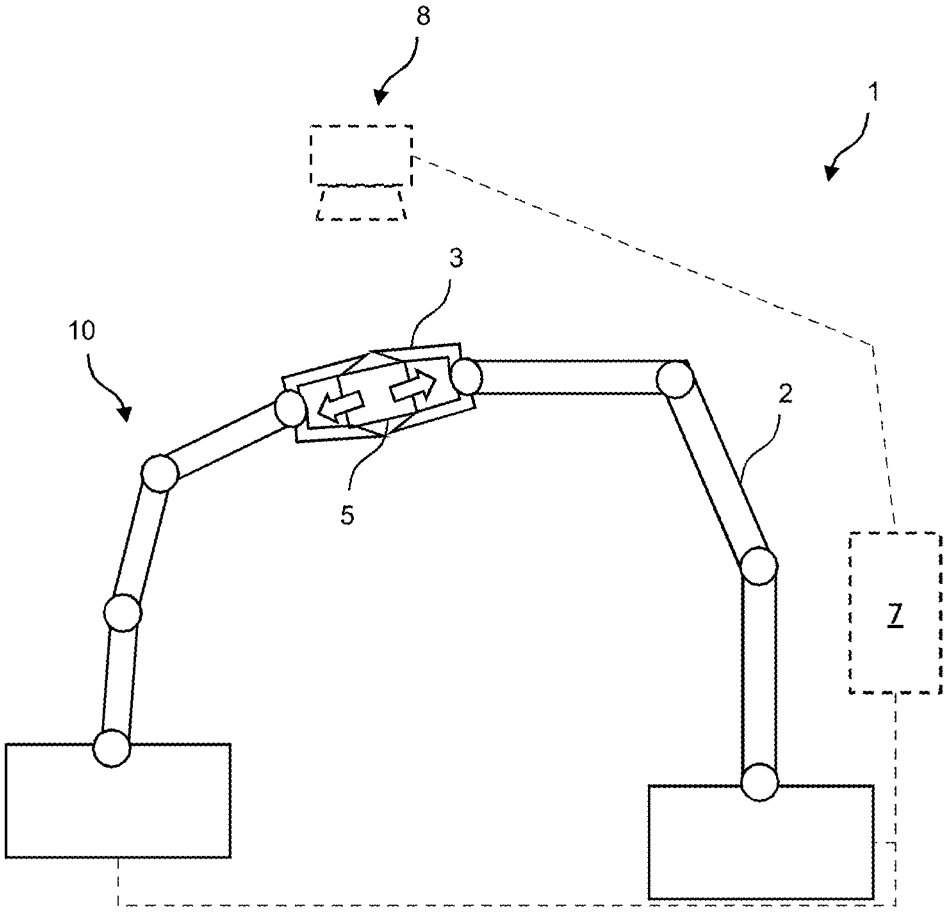
FIG. 2 depicts a system according to an alternative or additional embodiment.

FIG. 2 schematically shows a system 1 with a holding robot 10. Furthermore, FIG. 2 shows a robot 2 which has gripped an object 5 to be gripped. FIG. 2 shows, indicated in dashed lines, comparably to FIG. 1, a recording device 8 and also a processing unit 7, which is data-connected to the robot 2 and in particular to the holding robot 10 (also shown in dashed lines). The holding robot 10 is shown in FIG. 2 in such a way that it has gripped a determined holding grip position and is holding the object already gripped by the gripping robot in the direction opposite to the gripping direction of the gripping robot 2. The holding robot 10 can compensate for gravity in certain embodiments, in particular in the case of heavy and/or large objects. In FIG. 2, arrows further indicate that the holding robot 10 can apply a force to the object 5, in particular successively, which acts counter to a force exerted by the robot 2. Such a force can be rotational (opposite to the rotational force of the robot 2) in embodiments and, in particular, can be successively increased until the robot 2 loses or drops the object. From the maximum force used, values for the parameterization of the simulation environment or the simulation of the grip can be derived in embodiments, in particular these values can be transferred into the simulation. This is indicated in FIG. 2 by the data connections in dashed lines to the processing unit 7. Furthermore, the gripped object 5 can be tracked by a recording device 8 during the operation or method described above, in particular a trajectory of the object can be recorded, in particular continuously and/or in time steps in certain embodiments. The recording device 8 can, as indicated in FIG. 2 by the dashed lines, be attached externally or not arranged on at least one of the robots 2, 10, or in embodiments can be arranged on a flange of at least one robot 2, 10. The system 1 shown in FIG. 2 can then be constructed in the simulation environment, at least substantially, in the same way, so that a simulated (held) grip on an object can be or is simulated to the grip on the object in reality, in particular in embodiments is repeated until the simulated grip resembles the real grip, at least substantially (or within predetermined limits for an accuracy of reproduction).

Figure 3:
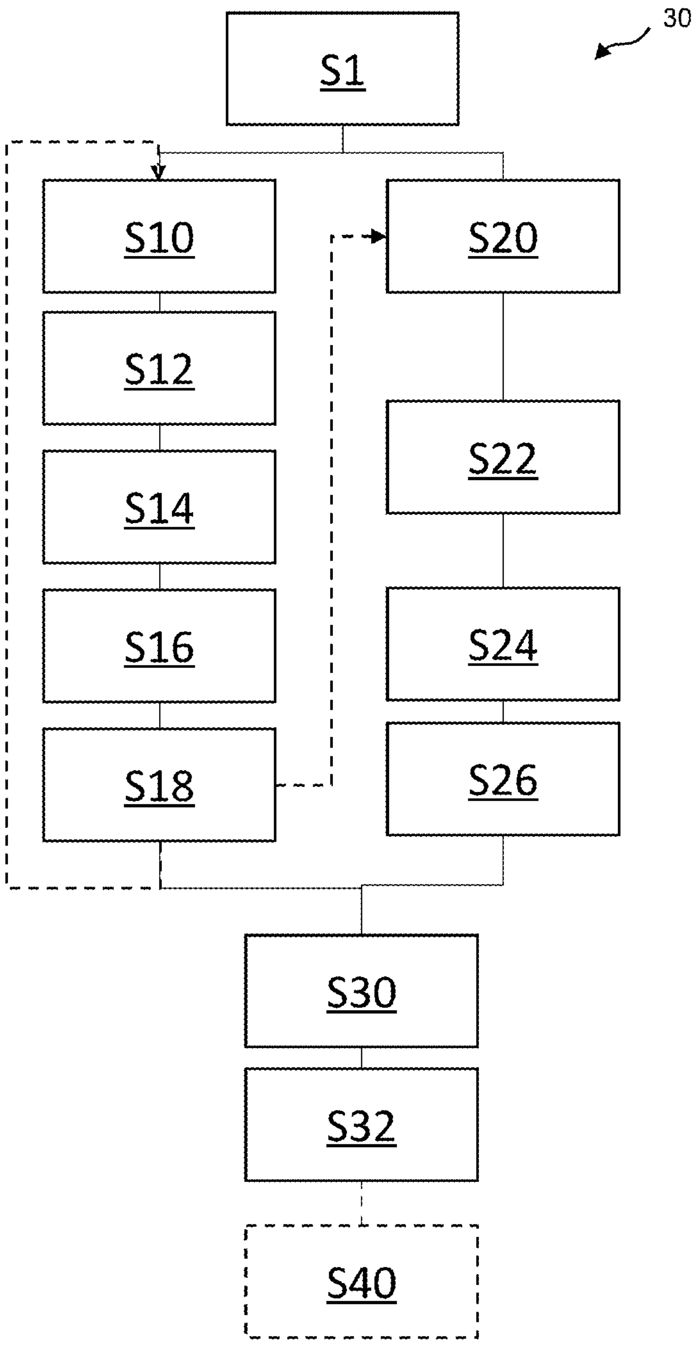
FIG. 3 shows schematically a block diagram of a method according to an embodiment.

FIG. 3 shows schematically a block diagram of a method 30. The method comprises a step S1 with determining of data (in reality). In this case, gripping real data S10 can be determined and/or holding real data S20 can be determined. The determining of gripping real data S10 comprises in particular a determining of grip positions on the object 5 to be gripped, represented by S12, wherein in embodiments this can be or is preceded by a randomized placement of the object to be gripped. Furthermore, FIG. 3 schematically shows a step with selection of one of the determined grip positions S14. S16 in FIG. 3 refers in particular to a gripping of the object 5 based on the grip position selected in S14. S18 schematically represents a storing of the gripping success for the selected grip position, in particular in a database or a memory. These steps can be repeated, as indicated in particular by the dashed arrow. In some embodiments, gripping real data can also be determined independently and optimization can already be carried out, in particular based solely on the stored data on gripping success, for improving or optimizing the grasp sampler.

Furthermore, in FIG. 3, S20 schematically shows determining of holding real data. In the illustrated embodiment, the determining of holding real data S20 comprises determining a holding grip position S22 on an object 5 gripped by a gripping robot. As previously indicated in FIG. 2, the grip position of the holding robot 10 is arranged such that, in one embodiment, a force can be applied to the object which is opposite to a force on the object 5 that is applied by the gripping robot 2. Furthermore, this is followed by, as shown by way of example, a gripping S24 at the determined holding grip position by, in particular, the holding robot 10. This is followed, as shown by way of example in FIG. 3, by exerting a force S26, in particular on the object 5, in the opposite direction to a force of the gripping robot 2 acting on the object 5.

In embodiments, the determining of holding real data S20 can follow the gripping of the object S16 or the storing S18 of the determining of gripping real data S10, as indicated in particular by the dashed arrow between S18 and S20.

Furthermore, FIG. 3 shows a simulation S30 of at least one of the preceding or above-described (real) gripping operations. In the simulation S30, one embodiment attempts to reproduce the real gripping operation, in particular as closely as possible, within a simulation environment. FIG. 3 shows an example of parameter optimization by S32. The optimization S32 is based on the previously determined gripping real data and/or the determined holding real data. Furthermore, the method, as shown in dashed lines, may comprise a step of controlling, moving and/or monitoring S40 a robot 2, 10, in particular during gripping, based on the determined optimized parameters, which are transferred for this purpose in one embodiment in control data for the robot 2, 10.

Although exemplary embodiments have been explained in the preceding description, it is pointed out that a large number of modifications is possible. It is also pointed out that the exemplary embodiments are merely examples that are not intended to restrict the scope of protection, the applications, and the structure in any way. Rather, the preceding description provides a person skilled in the art with guidelines for implementing at least one exemplary embodiment, with various changes, in particular with regard to the function and arrangement of the described components, being able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 System
2 Gripping robot
3 Gripper
5,5'Object to be gripped
6 Work surface
7 Processing unit
8 Recording device
10 Holding robot
30 Method
S10 Determining of gripping real data
S12 Determining of grip positions
S14 Selection of a determined grip position
S16 Gripping of the object
S18 Storing of the gripping success
S20 Determining of holding real data
S22 Determining of a holding grip position
S24 Gripping at the holding grip position
S26 Exertion of a force
S30 Simulation
S32 Optimization
S40 Control/movement of a robot

What is claimed is:

1. A method for automatic optimization of parameters for a robot-assisted gripping operation, the method comprising:

determining by a processor gripping real data, wherein the gripping real data describe at least one gripping success of a grip position on an object gripped using a gripping robot;

and/or determining by the processor holding real data, wherein the holding real data describe at least one parameter which is linked to a gripping operation, in particular grip, in particular a force on the object gripped using the gripping robot;

simulating by the processor, in particular replicating, at least one gripping operation, in particular grip, in a simulation environment based on the gripping operation, in particular grip, which forms the basis of at least one of the determined gripping real data or the determined holding real data; and data-based optimizing of parameters, in particular optimizing of the parameters based on at least one of the determined gripping real data or the determined holding real data, in order to determine optimized parameters.

2. The method of claim 1, wherein the data-based optimizing comprises an automatic adaptation of the parameters, in particular a simulated mass, simulated dynamic parameters and/or a simulated force, in particular friction.

3. The method of claim 1, wherein:

the data-based optimizing, in particular the optimizing of the parameters, is based on a cost function of gripping real data and gripping simulation data and/or holding real data and holding simulation data;

the gripping simulation data describe at least one simulated gripping parameter, in particular a gripping success of a grip position in the simulation; and the holding simulation data describe at least one simulated holding parameter, in particular a force of the simulated grip.

4. The method of claim 1, wherein the optimizing is carried out by a gradient-free optimizer.

5. The method of claim 1, wherein the determining of gripping real data comprises:

randomizing placement of an object to be gripped;

determining a plurality of grip positions, in particular collision-free and/or grippable grip positions, on the object to be gripped;

selecting one of the determined grip positions;

gripping the object, in particular with the gripping robot, based on the selected grip position;

storing the gripping success for the selected grip position; and repeating the steps until a predetermined termination criterion and/or until a predetermined number of repetitions, in particular in order to obtain reality data, in particular a pre-sorted set of grips, further in particular according to gripping success.

6. The method of claim 5, wherein selecting one of the determined grip positions is based on a selection frequency of the determined grip positions, and in particular the determined grip position with the lowest selection frequency is selected.

7. The method of claim 5, wherein randomizing placement of an object is carried out by the gripping robot, in particular in that the object is moved by the gripping robot to a random position and is then dropped.

8. The method of claim 1, wherein determining holding real data comprises:

determining a holding grip position, wherein the holding grip position is arranged on the object gripped by the gripping robot in such a way that a force can be exerted on the gripped object via the holding grip position, which force acts opposite to a force on the gripped object, in particular opposite to a gripping direction of the gripping robot;

gripping, in particular holding, the object at the determined holding grip position; and exerting a force on the object, which force acts in particular opposite to the gripping direction of the gripping robot.

9. The method of claim 8, wherein exerting the force comprises a successive increase of the force with predetermined steps, in particular until the gripping robot loses the object and/or a maximum force is exceeded.

10. The method of claim 1, wherein determining at least one of gripping real data or holding real data comprises recording the object by a recording device, in particular determining a pose of the object, in particular over time.

11. A method for controlling a robot to carry out a robot-assisted gripping operation, the method comprising:

determining control data based on the optimized parameters according to claim 1, and controlling and/or moving the robot based on the optimized control data in order to carry out a robot-assisted gripping operation.

12. The method of claim 1, wherein the determined optimized parameters are transferred, in particular applied, to a gripping application with a plurality of objects in a container.

13. A system for operating and/or monitoring at least one robot, in particular a gripping robot, which system is configured to carry out the method of claim 1.

14. A computer program or computer program product, wherein the computer program or computer program product comprises instructions, in particular stored on a computer-readable and non-transitory storage medium, which, when executed by one or more computers or a system, cause the computer or computers or the system to carry out the method of claim 1.

* * * * *